United States Patent [19]

Sydansk

[11] Patent Number: 4,947,935
[45] Date of Patent: Aug. 14, 1990

[54] KILL FLUID FOR OIL FIELD OPERATIONS

[75] Inventor: Robert D. Sydansk, Littleton, Colo.

[73] Assignee: Marathon Oil Company, Findlay, Ohio

[21] Appl. No.: 380,057

[22] Filed: Jul. 14, 1989

[51] Int. Cl.$^5$ ............................................. E21B 43/00
[52] U.S. Cl. .................................... 166/295; 166/268; 166/274; 166/285; 166/292
[58] Field of Search ............... 166/276, 270, 295, 294, 166/273, 300, 274, 279, 285, 295, 296, 292

[56] References Cited

U.S. PATENT DOCUMENTS 4,730,675  3/1988  Wygant ............................... 166/295

*Primary Examiner*—Jerome W. Massie
*Assistant Examiner*—Roger J. Schoeppel
*Attorney, Agent, or Firm*—Jack L. Hummel; Jack E. Ebel

[57] ABSTRACT

A flowing crosslinked polymer gel is employed as a kill fluid or as an additive to a kill fluid in a process for preventing the intrusion of formation fluid into a wellbore while minimizing wellbore fluid leakoff in the formation during conventional oil field operations in the wellbore. The gel comprises a carboxylate-containing polymer and a chromic carboxylate crosslinking agent.

27 Claims, No Drawings

KILL FLUID FOR OIL FIELD OPERATIONS

BACKGROUND OF THE INVENTION

1. Technical Field

The invention relates to hydrocarbon recovery from a subterranean hydrocarbon-bearing formation.

2. Background Information

Kill fluids are commonly placed in a wellbore during oil field operations, including drilling, wellbore completions, and workovers, to prevent the intrusion of formation fluids into the wellbore while the well is open. The kill fluid is often maintained in the wellbore for the entire duration of the operation.

Conventional kill fluids known in the art are typically aqueous liquids, which contain a weighting agent, such as inert inorganic solids in solution or suspension, to increase the density of the fluid. The weighted kill fluid applies a hydrostatic pressure against the formation fluid, which is greater than the pressure exerted by the formation fluid attempting to intrude into the wellbore. This overbalanced hydrostatic pressure prevents the intrusion of formation fluids into the wellbore during performance of the given oil field operation which is necessary from an operational standpoint to prevent interference from formation fluids and which is also necessary from a safety standpoint. Maintenance of a sufficient hydrostatic pressure in the wellbore reduces the potential of a well kick or blow out.

Thickeners ar often included in weighted kill fluids known in the art for leakoff inhibition. See, for example, Hudson et al., SPE Paper No. 10652, which discloses a weighted brine containing a fluid loss control agent, or U.S. Pat. No. 4,391,925, which discloses a multi-phase kill fluid comprising a number of constituents including a hydrocarbon, a surfactant, a clay and an organic polymer. Advantageous kill fluids are those which prevent formation fluid intrusion into the wellbore while preventing appreciable wellbore fluid leakoff into the formation. Fluid leakoff can undesirably result in formation damage, i.e., permeability reduction, which is manifested in reduced hydrocarbon recovery from the formation or reduced injectivity into the formation.

Despite the existence of numerous kill fluids in the art, many have limited utility. A need exists for a kill fluid having utility in hydrocarbon recovery operations over a broad range of operating conditions which can be encountered in situ. Specifically, a need exists for a kill fluid which effectively maintains a sufficient hydrostatic pressure in the wellbore under adverse conditions to prevent or minimize the intrusion of formation fluids into the wellbore without exhibiting significant leakoff into the formation or without significantly damaging the hydrocarbon formation.

SUMMARY OF THE INVENTION

The present invention is a process employing a kill fluid which provides an overbalanced hydrostatic pressure in a wellbore sufficient to prevent or minimize substantial flow of formation fluids into the wellbore during the performance of conventional oil field operations, such as drilling, completions, or workovers, while simultaneously preventing or minimizing the leakoff of wellbore fluids into the formation. The process employs a continuous, flowing, crosslinked, water-soluble, polymer gel as the kill fluid.

The utility of the present process in oil field operations is attributable to the specific composition of the gel used as the kill fluid. The polymer gel composition utilized in the present process comprises a carboxylate-containing polymer, a chromic carboxylate complex crosslinking agent and an aqueous solvent. The gel constituents are premixed at the surface to form a continuous flowing gel. When placed in a wellbore, the gel can effectively maintain a sufficient hydrostatic head in the wellbore to meet the performance requirements of the wellbore without excessive leakoff. The gel is nondamaging to the formation and any residual gel remaining in the wellbore is reversible if desired.

The gel employed in the present invention has utility over a broad range of operating conditions. The gel is effective in the presence of high salt concentration brines and is resistant to thermal degradation at temperatures generally encountered during oil field operations. Furthermore, the gel can be formulated over a very broad range of gel strengths, rheologies and viscosities. Nevertheless, the gel is relatively insensitive to minor variations in conditions under which it is formulated. Thus, the gel is readily suited for on-site preparation in the field where process controls are often imprecise, such as remote hostile onshore and offshore locations.

In addition to the above-recited operational advantages, the gel employed in the present invention can offer practical advantages over kill fluids known in the art. The present process is cost effective because the gel components are readily available and relatively inexpensive. The gel can be applied with conventional oil field equipment. Finally, the gel composition is relatively nontoxic in the environment and safe to handle.

Gels similar to those used in the process of the present invention have known utility in conformance improvement treatment (CIT) processes as shown in U.S. Pat. No. 4,683,949 and 4,744,499 to Sydansk et al., which are incorporated herein by reference. However, the performance requirements for kill fluids can be very different from those for CIT gels. CIT gels are generally employed during the hydrocarbon production phase of a wellbore while kill fluids are generally employed during a preproduction or production interruption phase of a wellbore where dynamic stresses on the gel can be much greater.

The art related to kill fluids indicates that the composition and resulting properties of the kill fluid must be specific to the requirements of the operation being performed. Unlike a CIT gel, the kill fluid must have sufficient strength and integrity to control fluid intrusion and leakoff under stressful conditions, yet have sufficient fluidity to allow concurrent performance of dynamic wellbore operations without substantial interference. Thus, the present invention fills a need in the art for a process which utilizes a polymer gel composition satisfying these parameters.

DESCRIPTION OF PREFERRED EMBODIMENTS

The present invention is a process performed in conjunction with oil field operations, including drilling, completions, and workovers, which are performed in accordance with methods known to those skilled in the art. The present process is applicable to a wellbore penetrating a subterranean hydrocarbon-bearing formation. The process of the present invention is initiated by formulating a crosslinked polymer gel composition at the surface and placing the composition in the wellbore prior to or during performance of the oil field operation.

The presence of the gel in the wellbore enables one to maintain the well uncapped and completely open to the surface during the performance of the operation if desired.

The term "crosslinked polymer gel" as used herein is directed to a continuous three-dimensional crosslinked polymeric network having a high molecular weight. The gel contains a liquid medium such as water which is contained within the solid polymeric network. The fusion of a liquid and a solid component into a single-phase system provides the gel with a unique phase behavior.

The gel composition used in the present process comprises a polymer, a crosslinking agent and an aqueous solvent. The polymer is a carboxylate-containing polymer which is a crosslinkable water-soluble polymer having one or more carboxylate groups or, alternatively, having one or more groups capable of being hydrolyzed to carboxylate groups (e.g., amide groups). The carboxylate-containing polymer satisfying these criteria may be either a synthetic polymer or a biopolymer. The average molecular weight of the polymer is in the range of about 10,000 to about 50,000,000, preferably about 100,000 to about 20,000,000 and most preferably about 200,000 to about 15,000,000.

The preferred polymer of the present invention is an acrylamide polymer, which is defined herein as a crosslinkable, water-soluble, synthetic polymer containing one or more acrylamide groups. Useful acrylamide polymers include polyacrylamide, partially hydrolyzed polyacrylamide and terpolymers containing acrylamide, acrylate, and a third species. As defined herein, polyacrylamide (PA) is an acrylamide polymer having substantially less than 1% of the acrylamide groups in a carboxylate form. Partially hydrolyzed polyacrylamide (PHPA) is an acrylamide polymer having at least 1%, but not 100%, of the acrylamide groups in a carboxylate form. The acrylamide polymer may be prepared according to any conventional method known in the art, but preferably has the specific properties of an acrylamide polymer prepared according to the method disclosed by U.S. Pat. No. No. Re. 32,114 to Argabright et al. incorporated herein by reference.

The crosslinking agent of the present invention is a chromic carboxylate complex. The term "complex" is defined herein as an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The complex of the present invention includes at least one or more electropositive chromium III species and one or more electronegative carboxylate species. The complex may advantageously also contain one or more electronegative hydroxide and/or oxygen species. It is believed that, when two or more chromium III species are present in the complex, the oxygen or hydroxide species may help to bridge the chromium III species. Each complex optionally contains additional species which are not essential to the polymer crosslinking function of the complex. For example, inorganic mono- and/or divalent ions, which function merely to balance the electrical charge of the complex, or one or more water molecules may be associated with each complex. Representative formulae of such complexes include:

$[Cr_3(CH_3CO_2)_6(OH)_2]^{1+}$;
$[Cr_3(OH)_2(CH_3CO_2)_6]NO_3 \cdot 6H_2O$;
$[Cr_3(H_2O)_2(CH_3CO_2)_6]^{3+}$;
$[Cr_3(H_2O)_2(CH_3CO_2)_6](CH_3CO_2)_3 \cdot H_2O$; etc. "Trivalent chromium" and "chromic ion" are equivalent terms encompassed by the term "chromium III" species as used herein. The carboxylate species are advantageously derived from water-soluble salts of carboxylic acids, especially low molecular weight mono-basic acids. Carboxylate species derived from salts of formic, acetic, propionic, and lactic acid, substituted derivatives thereof and mixtures thereof are preferred. The preferred carboxylate species include the following water-soluble species: formate, acetate, propionate, lactate, substituted derivatives thereof, and mixtures thereof. Acetate is the most preferred carboxylate species. Examples of optional inorganic ions include sodium, sulfate, nitrate and chloride ions.

A host of complexes of the type described above and their method of preparation are well known in the leather tanning art. These complexes are described in Shuttleworth and Russel, *Journal of the Society of Leather Trades' Chemists*, "The Kinetics of Chrome Tannage Part I.," United Kingdom, 1965, V. 49, p. 133-154; "Part III.," United Kingdom, 1965, v. 49, p. 251-260; "Part IV.," United Kingdom, 1965, v. 49, p. 261-268; and Von Erdman, *Das Leder*. "Condensation of Mononuclear Chromium (III) Salts to Polynuclear Compounds," Eduard Roether Verlag, Darmstadt Germany, 1963, v. 14, p. 249; and incorporated herein by reference. Udy, Marvin J. *Chromium, Volume 1: Chemistry of Chromium and its Compounds*, Reinhold Publishing Corp., N.Y., 1956, pp. 229-233; and Cotton and Wilkinson, *Advanced Inorganic Chemistry 3rd Ed.*, John Wiley and Sons, Inc., N.Y., 1972, pp. 836-839, further describe typical complexes which may be within the scope of the present invention and are incorporated herein by reference. The present invention is not limited to the specific complexes and mixtures thereof described in the references, but may include others satisfying the above-stated definition.

Salts of chromium and an inorganic monovalent cation, e.g., $CrCl_3$, may also be combined with the crosslinking agent complex to accelerate gelation of the polymer solution, as described in U.S. Pat. No. 4,723,605, which is incorporated herein by reference.

The gel is formed by admixing the polymer, the crosslinking agent and aqueous solvent at the surface. Surface admixing broadly encompasses inter alia mixing the gel components in bulk at the surface prior to injection or simultaneously mixing the components at or near the wellhead by in-line mixing means while injecting them.

Admixing is accomplished, for example, by dissolving the starting materials for the crosslinking agent in an appropriate aqueous solvent. Exemplary starting materials include solid $CrAc_3 \cdot H_2O$, solid $Cr_3Ac_7(OH)_2$, or a solution labeled "Chromic Acetate 50% Solution" commercially available from McGean-Rohco Chemical Co., Inc., 1250 Terminal Tower, Cleveland, Ohio 44113, U.S.A. The crosslinking agent solution is then mixed with an aqueous polymer solution to produce the gel. Among other alternatives, the starting materials for the crosslinking agent can be dissolved directly in the aqueous polymer solution to form the gel in a single step.

The present process enables the practitioner to customize or tailor-make a gel having a predetermined gelation rate and predetermined gel properties of strength and thermal stability from the above-described composition. The gelation rate is defined as the degree of gel formation as a function of time or, synonymously, the rate of crosslinking in the gel. The degree of crosslinking may be quantified in terms of several variables including gel viscosity, strength and plugging efficiency. Plugging efficiency is defined as the normalized reduction in flow rate through a narrow constriction or porous media exhibited by a crosslinked polymer gel relative to a non-gel fluid such as an uncrosslinked polymer solution having the same polymer concentration as the gel. Gel strength of a flowing gel is defined as the resistance of the gel to filtration or flow. Thermal stability is the ability of a gel to withstand temperature extremes without degradation.

Tailor-making or customizing a gel in the manner of the present invention to meet the performance requirements of a particular oil field operation is provided in part by correlating the independent gelation parameters with the dependent variable of gelation rate and resultant gel strength and stability. The independent gelation parameters are the surface and in situ gelation conditions including: temperature, pH, ionic strength and specific electrolytic makeup of the aqueous solvent, polymer concentration, ratio of the weight of polymer to the combined weight of chromium III and carboxylate species in the mixture, degree of polymer hydrolysis, and average molecular weight of the polymer.

The operable ranges of the gelation parameters are correlated with the dependent variables of gelation rate and resultant gel properties by means including qualitative bottle testing, quantitative viscosimetric analysis, filtration tests and core flooding experiments. The operable ranges of a number of gelation parameters and their correlation with the dependent variables are described below.

The lower temperature limit of the gel at the surface is its freezing point and the upper limit is essentially the thermal stability limit of the polymer. The gel is generally maintained at ambient temperature or higher at the surface. The temperature may be adjusted by heating or cooling the aqueous solvent. Increasing the temperature within the prescribed range increases the gelation rate.

The initial pH of the gel is within a range of about 3 to 13 and preferably about 6 to 13. Although gelation can occur at an acidic pH, lowering the initial pH below 7 does not favor gelation. The initial pH is most preferably alkaline, i.e., greater than 7 to about 13. When the polymer is PHPA, increasing the pH within the prescribed range increases the rate of gelation.

The polymer concentration in the gel is about 500 ppm up to the solubility limit of the polymer in the solvent or the rheological constraints of the polymer solution, preferably about 750 to about 200,000 ppm, and most preferably about 1000 to about 50,000 ppm. Increasing the polymer concentration increases the gelation rate and ultimate gel strength at a constant ratio of polymer to crosslinking agent.

The ionic strength of the aqueous solvent can be from that of deionized distilled water to that of a brine having an ion concentration approaching the solubility limit of the brine. Generally, fresh water has a total dissolved solids concentration below about 500 ppm and a produced brine has a total dissolved solids concentration above about 500 ppm. Thus, fresh water and produced brines fall within the useful range of the present invention. Increasing the ionic strength of the solution can increase the gelation rate.

The weight ratio of polymer to chromium III and carboxylate species comprising the mixture is about 1:1 to about 500:1, preferably about 2.5:1 to about 100:1, and most preferably about 5:1 to about 40:1. Decreasing the ratio generally increases the gelation rate and up to a certain point generally increases the gel strength, especially at a constant high polymer concentration.

The degree of hydrolysis for an acrylamide polymer is about 0 to 60% and preferably about 0 to 30%. Within the preferred range, increasing the degree of hydrolysis in most cases increases the gelation rate. Increasing the molecular weight of the polymer increases the gel strength.

It is apparent from these correlations that one can produce gels across a very broad range of gelation rates and gel properties as a function of the gelation conditions. Thus, to produce an optimum gel according to the present process, the practitioner predetermines the gelation rate and properties of the resultant gel which meet the performance requirements of a given situation and thereafter produces a gel having these predetermined characteristics. The performance requirements generally include in situ wellbore conditions, such as temperature, formation geology, and formation fluid pressure. Other performance requirements can include operational conditions. Analytical methods known to one skilled in the art are used to determine the performance requirements.

The gel employed as a kill fluid in the present process should have a sufficient hydrostatic head when placed in the wellbore to substantially reduce the volumetric flow of formation fluid into the wellbore relative to the volumetric flow of formation fluid into the wellbore prior to placement of the kill fluid therein. To do so the hydrostatic head of the gel should exert a hydrostatic pressure against the formation fluid attempting to intrude into the wellbore, which is equal to or greater than the formation fluid pressure. The gel preferably exerts a hydrostatic pressure which is substantially greater than the formation fluid pressure. The formation fluid pressure is in many cases about equal to the hydrostatic head of a column of formation fluid wherein the column is equal in height to the formation depth at the point where fluid flows into the wellbore. A gel having a density between about 1.0 kg/l and 1.9 kg/l and preferably between about 1.0 kg/l and 1.2 kg/l is generally adequate to meet these criteria.

The density of the gel can be augmented at the practitioner's option by the addition of a weighting agent. If one chooses to add a weighting agent to the gel, it may be suspended, dispersed or dissolved directly in the gel. Exemplary weighting agents include, inert inorganic salts (preferably monovalent inert inorganic salts), crushed rock, glass beads, and the like.

In addition to the density requirement, the gel must have sufficient structure, strength and stability to prevent or minimize leakoff of wellbore fluids into the formation during the entire oil field operation. Gels satisfying these criteria typically have a dynamic oscillatory viscosity at 0.1 radians per second which is between about $10^1$ and about $10^9$ cp and preferably between about $5 \times 10^2$ and about $10^6$ cp. The gel must retain sufficient viscosity and structure even when subjected to shear, high temperature, concentrated brines, and other potential sources of in situ degradation.

Once the flowing gel is formulated, it is injected into the wellbore as a completely gelled composition or, alternatively, it may be desirable to inject the flowing gel into the wellbore as a partially gelled composition. If the fluid is injected as a partial gel, complete gelation subsequently occurs in the wellbore. Injection of partial gels offers the feature of increasing gel viscosity in situ over time which may be advantageous in some instances.

A "partial gel" as referred to herein is at least somewhat crosslinked, but is capable of further crosslinking to completion resulting in the desired gel without the addition of more crosslinking agent. Partial gels have a viscosity and/or plugging efficiency greater than a uncrosslinked polymer solution. "Complete gelation" means that the gel composition is incapable of further crosslinking because one or both of the required reactants in the initial solution are consumed. Further crosslinking is only possible if either polymer, crosslinking agent, or both are added to the gel composition.

The volume of kill fluid injected into the wellbore will always be an amount which is at least sufficient to cover the wellbore face at the point where the formation fluid enters the wellbore. However, in most cases it will be necessary to fill the wellbore with a kill fluid to an even higher level to attain the requisite hydrostatic head. In any case, the maximum volume of kill fluid utilized in the present process is equivalent to the approximate volume of the drilled out bore hole or slightly exceeds it where some small leakoff occurs. The present process has utility in both cased and uncased wellbores depending on the particular operation it is complimenting.

The kill fluid is often maintained in the wellbore throughout the performance of the operation. However, because the kill fluid is not in a solid state, it enables one to perform the desired operation in the wellbore without substantially interfering with the operation. Once the oil field operation is completed, it is usual to begin or resume injection of fluids into the formation or production of formation fluids from the wellbore, depending on whether the wellbore is an injection or production wellbore. In many cases it is desirable to remove the gel from the wellbore before injecting or producing fluids. Since the gel remains flowing throughout the present process, it is readily removable from the wellbore by pumping or any other conventional means. Alternatively the gel can be removed from the wellbore concurrently with the production of formation fluids which displace the gel to the surface ahead of it.

In any case, all gels employed in the process of the present invention are reversible. Thus, if it is desired to enhance the removal of residual gel from the wellbore after the completion of a particular wellbore operation, this can be accomplished by reversing the gel with a conventional breaker, such as peroxides, hypochlorites or persulfates. The breaker can be incorporated into the initial gel composition at the surface to break the gel over time or the breaker can be placed in the wellbore separately to and reverse the gel on contact at the desired time.

The kill fluid of the present invention has been described above as the gel in its preferred embodiment. However, in a less preferred embodiment, the kill fluid can be a conventional, unthickened (i.e. polymer-free) weighted kill fluid. The above-described flowing gel is then employed as an additive of the conventional kill fluid. The gel functions as a thickener to prevent leakoff of the kill fluid into the formation.

This embodiment is less preferred because gels are oftentimes difficult to uniformly mix with conventional kill fluids and because the practical advantage (i.e., cost effectiveness) of the gel is diminished if the gel is but a small additive fraction of the total kill fluid volume. Nevertheless, the kill fluid of this embodiment is designed to perform in substantially the same manner as the kill fluid described above wherein the gel is the primary bulk component of the kill fluid (i.e., the gel makes up the majority of the kill fluid volume).

When the gel is used as an additive, it may be mixed with the conventional kill fluid either at the surface or in the wellbore. Typically, a weight ratio of gel to kill fluid is between about 9:1 and about 1:100 and preferably between about 9:1 and about 1:20.

The following examples demonstrate the practice and utility of the present invention, but are not to be construed as limiting the scope thereof.

The following table is useful in interpreting the qualitative data set forth in the examples below.

Gel Strength Code

Code

A No detectable gel formed: the gel appears to have the same viscosity as the original polymer solution and no gel is visually detectable.

B Highly flowing gel: the gel appears to be only slightly more viscous than the initial polymer solution.

C Flowing gel: most of the detectable gel flows to the bottle cap upon inversion.

D Moderately flowing gel: only a small portion (about 5 to 15%) of the gel does not readily flow to the bottle cap upon inversion; this gel is characterized as a "tonguing" gel.

E Barely flowing gel: the gel can barely flow to the bottle cap or a significant portion (>15%) of the gel does not flow upon inversion.

The polymer solutions of the following bottle testing examples are prepared by diluting an acrylamide polymer in an aqueous solvent and combining the dilute polymer solution with a crosslinking agent solution in a 0.12 liter wide mouth bottle to form a 0.05 liter sample. The sample is gelled in the capped bottle and the qualitative gel strength is determined by periodically inverting the bottle.

Where quantitative viscosity data are obtained, the gel is placed in a variable pressure and temperature rheometer (viscometer), having an oscillatory mode of 0.1 rad/sec and 100% strain. The apparent viscosity at a shear rate of about $0.1 \text{ sec}^{-1}$ is recorded as function of time.

In all of the examples, the acrylamide polymer is partially hydrolyzed polyacrylamide (PHPA), which is 30% hydrolyzed. The crosslinking agent solution is a complex or mixture of complexes comprising chromium III and acetate ions prepared by dissolving solid $CrAc_3.H_2O$ or $CrAc_7(OH)_2$ in water or diluting a solution obtained commercially under the label of "Chromic Acetate 50% Solution". The aqueous solvent is Denver, Colorado USA tap water unless stated otherwise.

EXAMPLE 1

The PHPA has a molecular weight of 11,000,000 and the aqueous solvent is an NaCl brine having a concentration of 5,000 ppm. The pH of the gelation solution is 8.6, the temperature is 22° C. and the ratio of PHPA to chromium III is 44:1. The data table below shows that the gel strength can be varied by varying the polymer concentration in the gelation solution while holding the ratio of polymer to crosslinking agent constant.

TABLE 1

| Run No. | 1 | 2 | 3 | 4 |
|---|---|---|---|---|
| ppm PHPA | 5,000 | 3,000 | 2,000 | 1,500 |
| ppm $Cr^{III}$ | 114 | 68 | 45 | 34 |
| Time (hr) | Gel Code | | | |
| 1.0 | A | A | A | A |
| 2.0 | B | A | A | A |
| 3.0 | B | A | A | A |
| 4.0 | B | A | A | A |
| 5.0 | C | B | A | A |
| 6.0 | C | B | A | A |
| 24 | C | B | B | A |
| 48 | C | B | B | A |
| 72 | C | B | B | A |
| 96 | D | B | B | A |
| 168 | E | B | B | A |
| 300 | E | B | B | A |
| 600 | E | B | B | A |
| 1200 | E | C | B | A |
| 2400 | E | C | B | A |

EXAMPLE 2

The PHPA has a molecular weight of 5,000,000 and has a concentration of 8400 ppm in the gelation solution. The aqueous solvent is an NaCl brine having a concentration of 5000 ppm. The pH of the gelation solution is 12.5, the temperature is 22° C., and the ratio of PHPA to chromium III is 40:1. The data table below shows that a utilitarian gel can be produced even at a relatively high pH.

TABLE 2

| Time (hr) | Gel Code |
|---|---|
| 0.5 | A |
| 1.0 | A |
| 1.5 | A |
| 2.0 | A |
| 2.5 | B |
| 4.0 | B |
| 5.0 | B |
| 6.0 | B |
| 7.0 | B |
| 8.0 | B |
| 24 | B |
| 28 | C |
| 48 | C |
| 80 | C |
| 168 | C |
| 600 | D |
| 2040 | D |

EXAMPLE 3

A series of gels are prepared under the same conditions as Example 2, but at a neutral pH of 7. Common oil field salts are added to the gelation solutions during formulation. The data table below shows that gels can be formed which are relatively insensitive to a number of common oil field salts.

TABLE 3

| Run No. | 1 | 2 | 3 |
|---|---|---|---|
| Salt | none (control) | NaNO$_3$ | MgCl$_2$ |
| ppm Salt | — | 2000 | 2000 |
| Time (hr) | Gel Code | | |
| 1.0 | A | A | A |
| 4.0 | A | A | A |
| 5.0 | B | B | B |
| 6.0 | B | B | B |
| 7.0 | B | B | B |
| 8.0 | C | C | C |
| 24 | C | C | C |
| 72 | D | D | D |
| 120 | E | E | E |
| 264 | E | E | E |
| 288 | E | E | E |
| 408 | E | E | E |

EXAMPLE 4

The PHPA has a molecular weight of 11,000,000. The ratio of polymer to crosslinking agent is 66:1. The aqueous solvent is a synthetic oil field brine at a pH of 7.5 and a temperature of 22° C. The composition of the synthetic brine is set forth below. The data table below shows that utilitarian gels can be formed in oil field brines.

TABLE 4

| Run No. | 1 | 2 |
|---|---|---|
| ppm PHPA | 3,000 | 5,000 |
| ppm $Cr^{III}$ | 45 | 76 |
| Time (hr) | Gel Code | |
| 0.25 | A | A |
| 0.5 | A | A |
| 4.0 | A | A |
| 5.0 | A | A |
| 6.0 | A | B |
| 7.0 | A | C |
| 24 | B | D |
| 96 | C | D |
| 150 | D | D |
| 197 | D | D |
| 936 | D | D |

| Synthetic Brine Composition | |
|---|---|
| | g/l |
| Na$_2$CO$_3$ | 0.249 |
| NH$_4$Cl | 0.086 |
| CaCl$_2$ | 0.821 |
| MgCl$_2$.6H$_2$O | 1.78 |
| Na$_2$SO$_4$ | 1.09 |
| NaCl | 6.89 |

EXAMPLE 5

The PHPA has a molecular weight of 5,000,000 and the aqueous solvent is an oil field brine having an H$_2$S concentration greater than 100 ppm and a total dissolved solids concentration of 0.33% by weight. The composition of the solvent is shown below. The pH of the gelation solution is 8.5 and the temperature is 60° C. The data table below shows that utilitarian gels can be formed in the presence of H$_2$S and at an elevated temperature.

TABLE 5

| Run No. | 1 | 2 | 3 |
|---|---|---|---|
| ppm PHPA | 3000 | 4000 | 5000 |
| ppm $Cr^{III}$ | 55 | 73 | 65 |
| Weight Ratio/PHPA:Cr | 55 | 55 | 77 |

TABLE 5-continued

| Time (hr) | | Gel Code | |
|---|---|---|---|
| 0.5 | A | A | A |
| 1.0 | A | A | A |
| 1.5 | A | B | C |
| 2.0 | B | C | D |
| 3.0 | C | D | D |
| 4.0 | D | D | D |
| 5.0 | D | D | E |
| 7.0 | D | E | E |
| 12 | D | E | E |
| 27 | D | E | E |
| 75 | D | E | E |
| 173 | D | E | E |
| 269 | D | E | E |
| 605 | D | E | E |

| Synthetic Brine Composition | |
|---|---|
| | ppm |
| $Na^+$ | 252 |
| $Mg^{2+}$ | 97 |
| $Ca^{2+}$ | 501 |
| $Cl^-$ | 237 |
| $SO_4^{2-}$ | 1500 |
| $HCO_3^-$ | 325 |

EXAMPLE 6

The PHPA has molecular weight of 5,000,000 and the aqueous solvent is an NaCl brine having a concentration of 3,000 ppm. The concentration of PHPA in the gelation solution is 5,000 ppm and the ratio of PHPA to chromium III is 32:1. The pH of the solution is 10.2 and the temperature is 22° C.

Three experiments are conducted to determine the effects of shear on the gel. The gel of Run 1 is aged without agitation. The gel of Run 2 is stirred for five minutes at 1750 rpm with a 4 cm propeller in a 6 cm ID capped bottle after one hour of aging. The gel of Run 3 is forced through a 10 cm long nylon tube with a 0.16 cm ID at a rate of 100 $cm^3$ in 7.2 sec. and at a pressure drop of 410 kPa (a shear rate of about 50,000 $sec^{-1}$) after one hour of aging. The data table below shows that the gels maintain their integrity even after undergoing shear during gelation.

TABLE 6

| Run No. | 1 | 2 | 3 |
|---|---|---|---|
| Time (hr) | | Gel Code | |
| 1.0 | A | A | A |
| 1.5 | B | B | B |
| 4.0 | D | D | D |
| 17 | E | E | E |
| 24 | E | E | E |
| 96 | E | E | E |

| Apparent Viscosity at 50 $sec^{-1}$ | | | |
|---|---|---|---|
| 96 | 1400 | 2000 | 2300 |

EXAMPLE 7

Two gel samples are prepared from PHPA having a molecular weight of 5,000,000 in the aqueous solvent of Example 5. The gel of the first sample is crosslinked with chromium III and the gel of the second sample is crosslinked with a chromium VI redox crosslinking system. The ratio of PHPA to crosslinker is optimized for each gel system.

The thixotropic loops are steady shear experiments performed at 22° C. on a Rheometric Pressure Rheometer. The data table below shows that the gel of the present invention has a much greater ability to withstand shear than a comparable gel prepared with a different crosslinking agent system.

TABLE 7

| Run No. | 1 | 2 |
|---|---|---|
| Crosslinker | $Cr^{III}$ | $Cr^{VI}$ Redox |
| ppm PHPA | 2500 | 3000 |
| PHPA:Crosslinker | 12.5 | 30 |
| Shear Rate ($sec^{-1}$) | Viscosity (cp) | |
| 5 | 5300 | 1800 |
| 10 | 3800 | 1400 |
| 20 | 1900 | 800 |
| 40 | 1200 | 500 |
| 60 | 900 | 400 |
| 80 | 800 | 300 |
| 100 | 600 | 200 |
| 80 | 800 | 200 |
| 60 | 900 | 200 |
| 40 | 1000 | 200 |
| 20 | 1400 | 200 |
| 10 | 2000 | 200 |
| 5 | 3100 | 200 |

EXAMPLE 8

The PHPA has a molecular weight of 5,000,000 and the aqueous solvent is an NaCl brine having a concentration of 3,000 ppm. The concentration of PHPA in the gelation solution is 5,000 ppm, the pH of the gelation solution is 10.2, the temperature is 105° F. and the ratio of PHPA to chromium III is 32:1. The gelation solution is aged for one hour after mixing at which time no gel is visually detected by bottle testing. 50 $cm^3$ of gel sample is placed in a Millipore filter holder. A pressure of 50 psi is applied to the gel in an effort to drive the gel through an 8 micron cellulose-acetate Millipore filter having a 47 mm diameter. Only 0.8 $cm^3$ of gelation solution passes through the filter after 10 minutes of applied pressure. An entire 50 $cm^3$ of polymer solution without crosslinking agent passes through the filter in 2.6 minutes under identical experimental conditions.

The results show that the gelation solution is sufficiently crosslinked after only one hour of aging to render it essentially unfilterable. Likewise a gelation solution that cannot pass through an 8 micron filter would not be expected to significantly permeate competent formation matrix rock having a permeability less than 1000 md. Nevertheless, bottle testing indicates that the gelation solution is highly pumpable.

EXAMPLE 9

A mature gel is prepared by crosslinking PHPA with a chromic acetate complex. The PHPA has a molecular weight of 11,000,000 and is diluted to a concentration of 5000 ppm in a synthetic injection water. About 0.5 l of the gel is injected for 14 hours across the face of 35 md Midcontinent Field carbonate core plug while a 42 psi differential pressure is applied to the length of the plug. The core plug is 2.7 cm long and has a diameter of 2.5 cm. A clear filtrate having essentially the viscosity of water is produced from the core plug.

After gel injection, the core plug is flooded for two days with about 8 pore volumes of brine until the permeability of the core plug stabilizes at 4.1 microdarcies ($k_{final}/k_{initial}=0.00012$). Thereafter, the first 4 mm of core material from the injection face are cut away from the core. The permeability of the remaining plug slightly exceeds the initial permeability of the plug (35 md).

The results indicate that permeability reduction is confined to the core material in the first 4mm from the injection face. Thus, the gel does not substantially invade formation rock and does not cause permeability reduction in the matrix a significant distance from the wellbore face.

EXAMPLE 10

A well in the Wyoming Big Horn Basin is producing liquid hydrocarbons from a 23 foot unfractured sandstone interval at 4300 feet which has an average permeability of 130 millidarcies. The production tubing is 2.875 inches ID.

It is desired to shut in the well for several weeks to observe responses at offsetting injection and production wells and to repair surface wellhead equipment. The well is killed by preparing a crosslinked polymer gel as the kill fluid. The polymer is a 30% hydrolyzed PHPA having a molecular weight of 11,000,000, which is in solution at a concentration of 4500 ppm. The solvent is a field water having a total dissolved solids concentration of 5800 ppm. NaCl is added to the polymer solution at a concentration of 7.3% by weight as a weighting agent. A crosslinking agent, comprising 85% by weight $CrAc_3$ and 15% by weight $CrCl_3$, is added to the polymer solution in a weight ratio of 14:1 (PHPA:crosslinking agent).

The production well is killed by injecting 19 barrels of the gel into the wellbore as a kill fluid. The workover operation and interference testing are performed during the two week shutin period. Thereafter, the well is put back on production and initially produces at 94% of its preworkover production rate. After one month of post-shutin production, the oil production rate is 97% of the preworkover rate, which indicates that the gel kill fluid caused minimal damage to the production interval.

While the foregoing preferred embodiments of the invention have been described and shown, it is understood that alternatives and modifications, such as those suggested and others, may be made thereto and fall within the scope of the invention.

I claim:

1. A process employing a kill fluid to substantially reduce the volumetric flow of formation fluid into a wellbore penetrating a formation containing said formation fluid below an earthen surface, comprising:
    admixing components of a continuous flowing gel at the surface comprising a water-soluble carboxylate-containing polymer, a complex capable of crosslinking said polymer and formed of at least one electropositive chromium III species and at least one electronegative carboxylate species, and an aqueous solvent for said polymer and said complex;
    crosslinking said polymer and said complex to form said gel, wherein said kill fluid comprises said gel;
    placing a volume of said kill fluid in said wellbore sufficient to create a hydrostatic head which exerts a kill fluid pressure against said formation fluid substantially equal to or greater than the formation fluid pressure and thereby substantially reduces the volumetric flow of said formation fluid into said wellbore:
    performing an oil field operation after placing said volume of said kill fluid in said wellbore; and
    removing said gel from said wellbore to substantially restore the volumetric flow of said formation fluid into said wellbore.

2. The process of claim 1 wherein said complex is additionally formed of at least one species selected from the group consisting of electronegative oxygen species, electronegative hydroxide species, inorganic monovalent ions, inorganic divalent ions, water molecules and mixtures thereof.

3. The process of claim 1 wherein said kill fluid further comprises an inert inorganic weighting agent.

4. The process of claim 1 wherein said polymer and said complex are crosslinked substantially to completion at the surface.

5. The process of claim 1 wherein said polymer and said complex are crosslinked substantially to completion in said wellbore.

6. The process of claim 1 wherein said kill fluid does not substantially leak off into said formation from said wellbore.

7. The process of claim 1 wherein said carboxylate-containing polymer is an acrylamide polymer.

8. The process of claim 1 wherein said carboxylate-containing polymer is selected from the group consisting of polyacrylamide and partially hydrolyzed polyacrylamide.

9. The process of claim 1 wherein said at least one electronegative carboxylate species is acetate.

10. The process of claim 1 wherein said formation fluid is a hydrocarbon and said wellbore is a hydrocarbon production wellbore for producing said hydrocarbon from said formation to said earthen surface.

11. The process of claim 1 wherein said wellbore is a fluid injection wellbore for injecting an injection fluid into said formation to facilitate the recovery of a hydrocarbon from said formation.

12. The process of claim 1 wherein said wellbore is cased.

13. The process of claim 1 wherein said wellbore is uncased.

14. The process of claim 10 further comprising:
    producing said hydrocarbon from said wellbore after completing said operation thereby displacing said gel to said surface.

15. The process of claim 11 further comprising:
    injecting said injection fluid into said wellbore after removing said gel from said wellbore.

16. The process of claim 1 further comprising reversing at least a portion of said gel with a breaker.

17. The process of claim 1 wherein said kill fluid pressure at the formation is substantially greater than said formation fluid pressure.

18. A process employing a kill fluid to substantially reduce the volumetric flow of formation fluid into a wellbore penetrating a formation containing said formation fluid below an earthen surface while substantially reducing the leakoff of said kill fluid into said formation for a time sufficient to perform an oil field operation in said wellbore, the process comprising:
    admixing components of a continuous flowing gel at the surface comprising a water soluble acrylamide polymer and a chromic acetate complex;
    crosslinking said polymer and said complex to form said gel, wherein said kill fluid comprises said gel;
    placing a volume of said kill fluid in said wellbore sufficient to create a hydrostatic head which exerts a kill fluid pressure against said formation fluid substantially equal to or greater than the formation fluid pressure and thereby substantially reduce the volumetric flow of said formation fluid into said wellbore without leaking off a substantial volume of said kill fluid into said formation from said wellbore;

performing said oil field operation in said wellbore after placing said kill fluid in said wellbore; and removing said gel from said wellbore.

19. A process employing a kill fluid to substantially reduce the volumetric flow of formation fluid into a wellbore penetrating a subterranean formation while inhibiting leakoff of said kill fluid into said formation from said wellbore, the process comprising:

admixing a flowing gel at the surface comprising a water-soluble carboxylate-containing polymer, a complex capable of crosslinking said polymer and formed of at least one electropositive chromium III species and at least one electronegative carboxylate species, and an aqueous solvent for said polymer and said complex;

crosslinking said polymer and said complex to form said flowing gel;

adding an amount of said flowing gel to said kill fluid sufficient to inhibit leakoff of said kill fluid from said wellbore into said formation;

maintaining said kill fluid containing said gel in said wellbore to substantially reduce the volumetric flow of said formation fluid into said wellbore without leaking off a substantial volume of said kill fluid into said formation;

performing an oil field operation after placing said kill fluid in said wellbore; and removing said gel from said wellbore.

20. The process of claim 19 wherein said polymer and said complex are crosslinked substantially to completion at the surface.

21. The process of claim 19 wherein said polymer and said complex are crosslinked substantially to completion in said wellbore.

22. The process of claim 19 wherein said gel is added to said kill fluid in said wellbore.

23. The process of claim 22 wherein said polymer and said complex are crosslinked substantially to completion at the surface.

24. The process of claim 19 wherein said gel is added to said kill fluid at the surface prior to placement in said wellbore.

25. The process of claim 19 wherein said kill fluid is initially an aqueous brine substantially free of said polymer.

26. The process of claim 19 further comprising removing said kill fluid containing said gel from said wellbore such that the permeability of said formation is not substantially reduced.

27. The process of claim 19 wherein said complex is additionally formed of at least one species selected from the group consisting of electronegative oxygen species, electronegative hydroxide species, inorganic monovalent ions, inorganic divalent ions, water molecules and mixtures thereof.

* * * * *

UNITED STATES PATENT AND TRADEMARK OFFICE
CERTIFICATE OF CORRECTION

PATENT NO. : 4,947,935

DATED : August 14, 1990

INVENTOR(S) : Robert D. Sydansk

It is certified that error appears in the above-identified patent and that said Letters Patent is hereby corrected as shown below:

Col. 7, line 14: Delete "a" and insert therefor "an".
Col. 8, line 26: "Code" should be located at left margin.
Col. 13, line 44: After "flow of" insert --a--.
Col. 14, line 51: Delete "reduce" and insert therefor --prevent--.
Col. 14, line 51: After "flow of" insert --a--.
Col. 15, line 7: After "flow of" insert --a--.

Signed and Sealed this

Twenty-ninth Day of October, 1991

Attest:

HARRY F. MANBECK, JR.

*Attesting Officer*   *Commissioner of Patents and Trademarks*